Aug. 12, 1952

E. MARTIN ET AL 2,606,362

METHOD OF MAINTAINING THE DESIRED JOINT
THICKNESS DURING A SOLDERING OPERATION
Filed Oct. 29, 1947

INVENTORS
ERLE MARTIN
ALDEN P. EDSON
BY Harris G. Luther
ATTORNEY

Patented Aug. 12, 1952

2,606,362

UNITED STATES PATENT OFFICE 2,606,362

METHOD OF MAINTAINING THE DESIRED JOINT THICKNESS DURING A SOLDERING OPERATION

Erle Martin, West Hartford, and Alden P. Edson, Hartford, Conn., assignors to United Aircraft Corporation, East Hartford, Conn., a corporation of Delaware Application October 29, 1947, Serial No. 782,824

7 Claims. (Cl. 29—359)

1

The present invention relates to the joining of metal parts by means of solder. The term solder, as used herein, includes not only the metals and alloys such as those of lead and tin which melt below 1000° F., but also metals and alloys of melting temperatures higher than 1000° F., such as the class of materials commonly known as silver solders and brazing metals. In like manner our term soldering is used in the broader sense, and includes such operations as silver soldering and brazing.

Objects and advantages of the invention will be set forth in part hereinafter and in part will be obvious herefrom or may be learned by practice with the invention, the same being realized and attained by means of the processes and compositions pointed out in the attendant claims.

The invention consists in the novel processes and compositions herein shown and described.

The accompanying drawing, referred to herein and constituting a part hereof, illustrate one embodiment of the invention, and together with the description, serve to explain the principles of the invention.

The art of joining metals together by such operations as brazing, soldering, and the like has heretofore employed metals in the fluid state. For joints of maximum strength, a specific thickness of bonding alloy is required in the final joining. On order to secure this thickness, various mechanical methods of joint spacing have conventionally been utilized. Among these mechanical methods are the incorporation into the joint of spacer wires, or projections on one or both of the metal parts being joined. These devices frequently impair the quality of the finished assembly or render difficult the assembly of the parts prior to bonding. In soldering with alloys which are fluid under soldering conditions, it is usually necessary to provide solder metal in excess of that required to fill the joint. This results in use of larger quantities of alloy than are necessary, thus increasing costs, and frequently rendering difficult the coating or bonding of only those surfaces which it is desired to join together. The surplus of solder necessarily present when brazing by conventional techniques may disturb the bond geometry so as to produce highly deleterious effects.

An object of the present invention is to provide a process whereby a uniformly thick joint between metal parts, with optimum tensile strength, is obtained. Another object is to provide a process whereby this uniformity and high strength is obtained throughout the entire soldered area. A further object is to provide a process whereby these results may be obtained regardless of the position in which the metals to be joined are held.

We have found that a solder which does not have a sharp melting point but which has instead a melting range of appreciable width with a solidus temperature below that of the metal parts being joined will produce strong bonds of controlled thickness when heated to a temperature between the solidus and liquidus of the solder and below the solidus of the metal parts being joined. The solder may be introduced into the joint prior to assembly in such form as to provide the desired joint thickness after the soldering operation. Among the forms in which the solder may be introduced to accomplish this result are foil, ribbons, or particles. During the soldering operation sufficient pressure must be applied to the joint to insure intimate contact between the solder and the parts being joined. The joints are preferably formed under conditions of soldering such that the contact between the metal parts and solder involves the entire joint area. Conventional cleaning techniques and fluxes are suitable for use with this process. In choosing alloys suitable for use with this process it is desirable to work with those of melting range sufficiently wide to avoid the necessity of extremely close control of temperature in the soldering operation in order to maintain satisfactory control of the ratio of liquid to solid metal in the solder during the joining operation. Enough of the solder must be molten to thoroughly wet the metal surfaces and enough must be maintained in the solid state for spacing. If an excessive portion of the solder is molten under soldering conditions, pressure on the joint may expel large amounts of alloy from the desired bond area, impairing the geometry of the joint, and may even carry out some of the solid particles which otherwise serve to maintain joint thickness. The portion of the solder desired molten under soldering operation is an inverse function of the pressure used during the joining operation.

Of the drawing—

Figure 1:
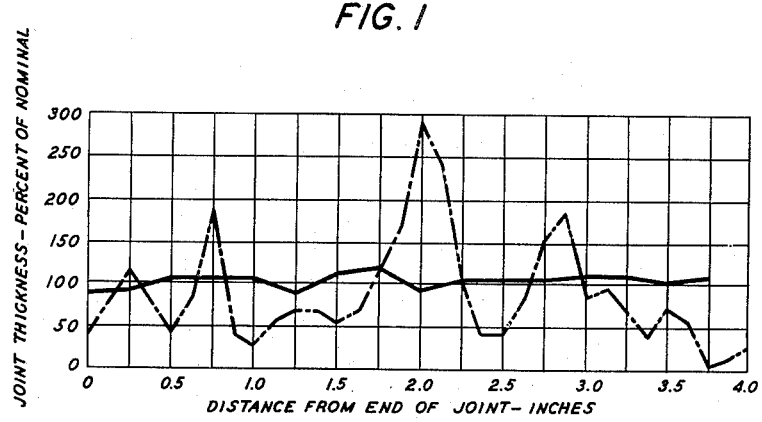
Figure 1 is a graphical rectilinear representation of results obtained by the use of an embodiment of the present invention as compared with results obtained through conventional methods of the prior art.

*Example 1.*—In the manufacture of a hollow steel propeller blade comprising a sheet steel airfoil section brazed to a hollow central core member the shell interior and core exterior are first completely cleaned by abrasive techniques. A clean sheet of silver solder 0.003" thick and cut to the contour of the joint desired, consisting of approximately 20% silver, 45% copper, 30% zinc, and 5% cadmium is placed over the core tip and down the sides of the core. The shell is slipped over the sub-assembly and is sealed to the core exterior to form a gas-tight volume with a steel pipe opening into the leading and trailing edge cavities. The blade is placed in a refractory alloy die which is clamped shut. The shell volume is then thoroughly purged with a dry mixture of approximately 92% nitrogen and 8% hydrogen, exhausting the gas so as to maintain a pressure within the shell of approximately 10 p. s. i. At the same time the core interior is thoroughly purged with an atmosphere of pure dry nitrogen maintained at a pressure of 50 p. s. i., which is sufficient to bring and maintain the parts in contact with the solder. After completely purging the shell and core the die and blade assembly are heated to a temperature of 1180° F. to 1220° F. for a period of approximately one-half hour, and subsequently allowed to cool. After cooling to a temperature of approximately 800° F., which is below the temperature of complete solidification of the solder, first the shell pressure, and then the core pressure, are released and the blade is withdrawn from the die and allowed to cool to room temperature. A strong joint is formed by this operation free from objectionable blobs, such as those which result from the use of spacers, with a geometry comparable to that of the foil initially placed in the joint area and free from objectionable or potentially corrosive residues. The joint thickness after the brazing operation is slightly less than the thickness of foil used and is substantially uniform.

*Example 2.*—In the manufacture of a hollow steel propeller blade comprising a sheet steel airfoil section brazed to a hollow central core member, the shell interior and core exterior are first cleaned by conventional chemical and mechanical methods. A clean sheet of silver solder 0.003" thick and cut to the contour of the joint desired, consisting of approximately 54% silver, 40% copper, 5% zinc, and 1% nickel containing 35% by volume of undissolved uniformly distributed tungsten particles of approximately 0.0025" average diameter or thickness is placed over the tip of the core extending down both sides toward the shank. The shell is slipped over the sub-assembly and is sealed to the core exterior to form a gas-tight volume with a steel pipe opening into the leading and trailing edge cavities. The blade is placed in a refractory alloy die which is clamped shut. The shell volume is then thoroughly purged with dry nitrogen and then with boron trifluoride, exhausting the boron trifluoride through a seal so as to maintain pressure in the shell volume sufficient to maintain the shell exterior surface in contact with the die cavity. After completely purging the shell with boron trifluoride, only sufficient boron trifluoride gas is supplied to maintain shell pressure. Gas pressure of 16 p. s. i., which is sufficient to bring and maintain the parts in contact with the solder, is applied to the core interior and the die and blade assembly are run into a furnace maintained at a temperature of 1600 to 1675° F. The blade and die are left in the furnace for sufficient time to bring the blade substantially to furnace temperature. At the end of this time the blade and die are withdrawn from the furnace and cooled. First the shell pressure and then the core pressure are released after the assembly has cooled to 1000° F., which is below the temperature at which the solder is completely solid. The shell volume is purged with dry nitrogen until free from boron trifluoride to produce a blade with the shell and core securely joined and free from objectionable deposits. The joint is substantially confined to the area of contact between the components and foil, is substantially free from objectionable blobs and is of thickness comparable to that of the original foil.

*Example 3.*—In the manufacture of a pressure sensitive element, two discs of copper sheet approximately 0.010" thick are cleaned by conventional methods and are coated with a conventional low temperature silver brazing flux. A ribbon of silver solder approximately ⅛" wide and approximately 0.002" thick composed of approximately 50% silver, 15.5% copper, 16.5% zinc, and 18% cadmium containing approximately 30% by volume of tungsten particles with an average diameter or thickness of approximately .0015" is introduced between the discs at their circumference. This assembly is heated to a temperature of 1200 to 1250° F. under a pressure of approximately 75 p. s. i., perpendicular to the area being bonded, and is then allowed to cool. Pressure on the assembly is released after cooling to 1000° F., at which time the solder is completely solid. A joint is formed in the region in which the foil is placed and with a thickness comparable to that of the original foil.

With respect to the amount of solder by volume that is molten during the brazing operation, we have found that generally not more than 70% should be molten for preferred results. However, in the joining of metals other than those described in the examples, a substantially higher percent of molten solder may be present. When the joints are desired, as little as 10% fusion of the alloy may provide satisfactory joining with high pressures, while as much as 75–80% fusion of the alloy may be desirable for use with low pressures. When thick joints are desired under comparable pressure perpendicular to the bond area, a smaller proportion of molten alloy is normally desirable.

Referring now in detail to the accompanying drawing, Figure 1 shows the results that may be obtained by use of the present invention showing the extremely uniform thickness throughout and along a brazed joint, which results are shown by the solid line, as compared with the grossly uneven variations along a brazed joint prepared by means of the conventional brazing technique of the prior art, which latter results are shown by the broken line.

Figure 2:
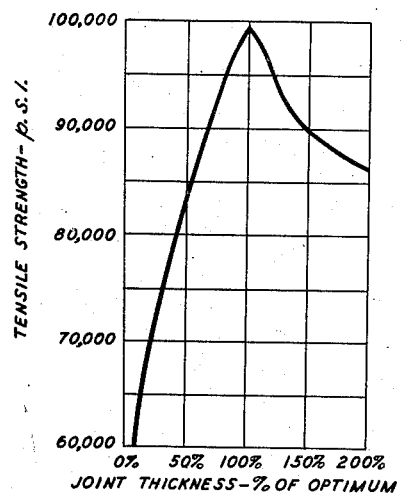
Figure 2 is a graphical representation of the maintaining of the optimum joint thickness of an embodiment of the present invention and the effect of such joint thickness upon the tensile strength of the joint.

In Figure 2, the critical nature of the relation between joint thickness and the tensile strength of the joint is shown by the sharp decrease in tensile strength as the optimum thickness is exceeded or not attained.

In the foregoing examples the thickness of the joint obtained is substantially the optimum and would lie at or very near the apex of the curve of Figure 2. Thus, a technician knowing that such a critical optimum exists could very easily determine the optimum range for whatever materials he is working with.

Among the metals which we have actually joined by this process are: steel, copper, silver, and nickel. Any metals which can be joined by the conventional soldering or brazing processes can be joined by our method. Among the solders which we have found useful for this operation are those consisting of silver-copper-zinc-tin, silver-copper-zinc-cadmium, silver-copper-zinc-cadmium alloy containing tungsten particles, silver-copper-zinc alloy containing tungsten particles, silver-copper-zinc-nickel alloy containing tungsten particles, and silver-copper-zinc-nickel, and silver-copper-zinc. Any solder which provides the necessary ratio of solid and liquid metal at soldering temperature would be similarly useful.

The invention in its broader aspects is not limited to the specific mechanisms shown and described but departures may be made therefrom within the scope of the accompanying claims without departing from the principles of the invention and without sacrificing its chief advantage.

We claim:

1. The process of joining metal parts by a solder having a solidus temperature below that of said metal parts and such that at a predetermined temperature within the melting range of said solder a portion of the solder is molten and a portion is solid, which comprises placing the solder between the metal parts to be joined, heating the metal parts and the solder in contact under pressure to said predetermined temperature to melt a portion only of said solder, the molten portion being sufficient to substantially uniformly wet the surfaces of the metal parts in contact with the solder, controlling the temperature and pressure so that a portion of the solder always remains solid throughout the joining operation and maintains the desired joint thickness, and subsequently cooling under compressive restraint to below the solidus temperature of the solder.

2. The process according to claim 1 in which the metal parts and solder are treated to provide chemically clean surfaces before solidus temperature of brazing alloy is reached.

3. The process of claim 1 in which the joining of the metal parts is carried out in a stable atmosphere inert with respect to the metals present.

4. The process of claim 1 in which the joining of the metal parts is carried out in a fluxing gaseous atmosphere.

5. The process of claim 1 in which the composition of the solder is:

| | Per cent |
|---|---|
| Silver | 40–70 |
| Copper | 25–55 |
| Zinc | 5–15 |
| Nickel | 0–7 |

6. The process of claim 1 in which the composition of the solder is:

| | Per cent |
|---|---|
| Silver | 5–30 |
| Copper | 15–70 |
| Zinc | 15–40 |
| Cadmium | 2–15 |

7. The process of claim 1 in which the metal parts are the metal components of a propeller blade.

ERLE MARTIN.
ALDEN P. EDSON.

REFERENCES CITED

The following references are of record in the file of this patent:

UNITED STATES PATENTS

| Number | Name | Date |
|---|---|---|
| 1,281,126 | Bevan | Oct. 8, 1918 |
| 1,950,214 | Bassler | Mar. 6, 1934 |
| 2,155,307 | Hagemann | Apr. 18, 1939 |
| 2,226,944 | Reeve | Dec. 31, 1940 |
| 2,431,611 | Durst | Nov. 25, 1947 |
| 2,451,099 | La Motte | Oct. 12, 1948 |

FOREIGN PATENTS

| Number | Country | Date |
|---|---|---|
| 341,340 | Great Britain | Jan. 15, 1931 |
| 547,784 | Great Britain | Sept. 10, 1942 |